US009073575B2

(12) United States Patent
Bryant

(10) Patent No.: US 9,073,575 B2
(45) Date of Patent: Jul. 7, 2015

(54) MEMORY FEATURES FOR A MANUALLY ADJUSTABLE APPARATUS

(75) Inventor: Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 722 days.

(21) Appl. No.: 12/778,195

(22) Filed: May 12, 2010

(65) Prior Publication Data
US 2011/0279282 A1 Nov. 17, 2011

(51) Int. Cl.
| H01B 3/36 | (2006.01) |
| G08B 5/22 | (2006.01) |
| G08B 5/24 | (2006.01) |
| G08B 25/00 | (2006.01) |
| G08B 3/00 | (2006.01) |
| G05B 23/02 | (2006.01) |
| G08B 21/00 | (2006.01) |
| G08B 25/08 | (2006.01) |
| B62D 1/187 | (2006.01) |
| B60N 2/06 | (2006.01) |
| B60N 2/16 | (2006.01) |
| B60N 2/22 | (2006.01) |
| B60R 1/04 | (2006.01) |
| B60R 16/037 | (2006.01) |
| B60N 2/02 | (2006.01) |

(52) U.S. Cl.
CPC  *B62D 1/187* (2013.01); *B60N 2/06* (2013.01); *B60N 2/16* (2013.01); *B60N 2/22* (2013.01); *B60R 1/04* (2013.01); *B60R 16/037* (2013.01); *B60N 2002/0272* (2013.01)

(58) Field of Classification Search
CPC ............... B60N 2/0248; B60N 2/366; B60N 2002/0268; B60N 2/01583; B60N 2/06; B60N 2/14; B60N 2/22; B60N 2/0228; B60N 2/2245; B60N 2/2358; B60N 2/42736

USPC ............................................. 340/686.1–686.6
See application file for complete search history.

(56) References Cited

U.S. PATENT DOCUMENTS

| 3,280,639 | A | * | 10/1966 | Vorpahl | ........................ | 73/484 |
| 4,946,223 | A | * | 8/1990 | Croft et al. | ................ | 297/367 R |
| 5,571,273 | A | * | 11/1996 | Saarinen | .................. | 297/215.15 |
| 5,670,853 | A | * | 9/1997 | Bauer | .......................... | 318/286 |

(Continued)

OTHER PUBLICATIONS

Author: www.merriam-webster.com, Title: Defination of term "Vehicle", Captured on Nov. 2, 2014, Publisher: Merriam Webster, Pertinenet Pages: Entire Document.*

Primary Examiner — Steven Lim
Assistant Examiner — Muhammad Adnan
(74) Attorney, Agent, or Firm — Quinn Law Group, PLLC

(57) ABSTRACT

A system is disclosed for manually pre-selecting and retrieving a position of an apparatus arranged inside a vehicle. The system includes an adjustment device operatively connected to the apparatus and configured to manually pre-select and lock the position of the apparatus relative to the vehicle. The system additionally includes a sensory signaling device operatively connected to the apparatus and selectively moveable within a predetermined range with respect to the vehicle. The sensory signaling device is configured to identify the pre-selected position of the apparatus and provide a sensory signal indicative of the pre-selected position, thereby facilitating the manual retrieval of the position without trial and error experimentation. A method for manually pre-selecting and retrieving a position of an apparatus arranged inside a vehicle is also disclosed.

13 Claims, 4 Drawing Sheets

(56) References Cited

U.S. PATENT DOCUMENTS

| | | | |
|---|---|---|---|
| 5,788,326 A * | 8/1998 | Kawade et al. | 297/236 |
| 5,803,491 A * | 9/1998 | Barnes et al. | 280/735 |
| 5,822,707 A * | 10/1998 | Breed et al. | 701/49 |
| 5,964,455 A * | 10/1999 | Catanzarite et al. | 267/131 |
| 6,163,125 A * | 12/2000 | Bernauer et al. | 318/626 |
| 6,240,352 B1 * | 5/2001 | McCurdy | 701/45 |
| 6,935,692 B2 * | 8/2005 | Nishide et al. | 297/344.11 |
| 7,009,386 B2 * | 3/2006 | Tromblee et al. | 324/207.2 |
| 7,159,683 B2 * | 1/2007 | Reitter | 180/268 |
| 7,424,355 B2 * | 9/2008 | Molitor et al. | 701/45 |
| 7,978,084 B2 * | 7/2011 | Dixon et al. | 340/573.1 |
| 8,087,791 B2 * | 1/2012 | Okuda et al. | 359/843 |
| 2001/0011839 A1 * | 8/2001 | Mori | 297/256.13 |
| 2003/0001748 A1 * | 1/2003 | Dalton | 340/657 |
| 2003/0169033 A1 * | 9/2003 | Tromblee et al. | 324/207.2 |
| 2007/0132220 A1 * | 6/2007 | Breed et al. | 280/735 |
| 2008/0067845 A1 * | 3/2008 | Ohren et al. | 297/256.16 |
| 2009/0002184 A1 * | 1/2009 | Lenneman et al. | 340/665 |

* cited by examiner

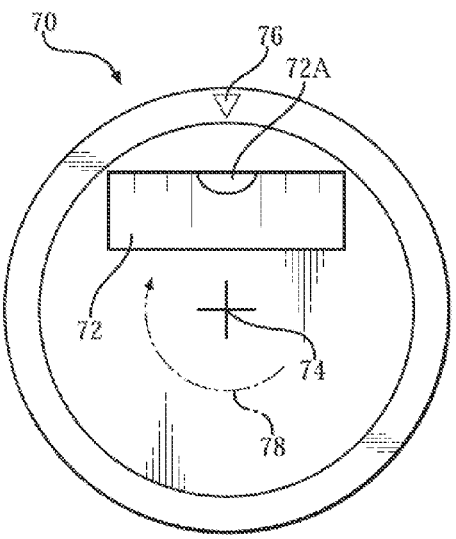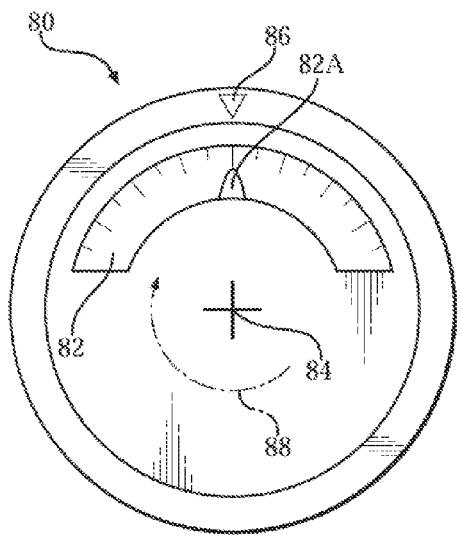
FIG. 3  FIG. 4
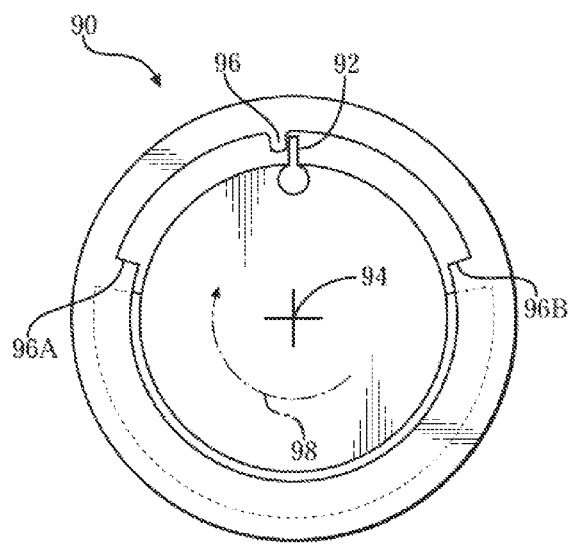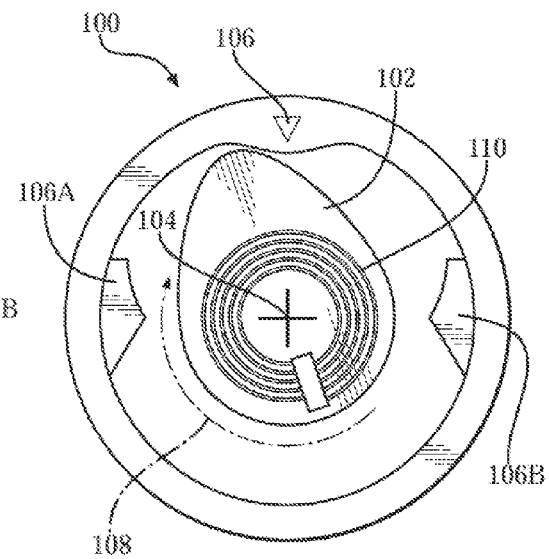
FIG. 5  FIG. 6

MEMORY FEATURES FOR A MANUALLY ADJUSTABLE APPARATUS

TECHNICAL FIELD

The invention relates to providing memory features for a manually adjustable apparatus, and, in particular, to manually pre-selecting a position and facilitating retrieval of the position of an apparatus located in a vehicle.

BACKGROUND OF THE INVENTION

Some vehicles employ power assisted selection of positions for various apparatuses, such as for steering wheels and seats, to accommodate an occupant, while other vehicles provide manual selection of positions for the same apparatuses. For example, with respect to seats, adjustments may be provided for seatback rake and fore-aft positions. Typically, specific adjustments are also provided for a driver of the vehicle, such as for a position of a steering wheel and/or a rearview mirror.

Frequently, power assisted selection of positions for such apparatuses, in particular, for those provided for the driver, also employ electronically stored memory features that allow an occupant to designate and store for future retrieval his/her preferred position. Such electronically stored memory features permit the preferred position to be returned to the subject apparatus quickly and easily, without trial and error experimentation. Additionally, such electronically stored memory features frequently have the capacity to retain more than one preferred position, thereby allowing multiple individuals to set, and subsequently retrieve, their particular positions on demand.

SUMMARY OF THE INVENTION

A system is disclosed for manually pre-selecting and retrieving a position of an apparatus arranged inside a vehicle. The system includes an adjustment device operatively connected to the apparatus and configured to manually pre-select and lock the position of the apparatus relative to the vehicle. The system additionally includes a sensory signaling device operatively connected to the apparatus and selectively moveable within a predetermined range with respect to the vehicle. The sensory signaling device is configured to identify the pre-selected position of the apparatus and provide a sensory signal indicative of the pre-selected position, thereby facilitating the manual retrieval of the position without trial and error experimentation.

The sensory signaling device may include a reference feature fixed relative to one of the apparatus and the vehicle, and at least one of a visual, an audible, and a tactile indicator. In such a case, the indicator may be adapted to be selectively moveable relative to and interact with the reference feature to identify the pre-selected position and provide the sensory signal.

The visual indicator may be a gauge having a pointer arranged to be selectively moveable on a track with respect to the reference feature. The visual indicator may also be a bubble-level device configured to be moveable with respect to the reference feature to indicate the position of the apparatus.

The audible indicator may be arranged moveably on a track and adapted to interact with the reference feature by establishing a detent for clicking against the feature to generate an audible signal indicative of the position of the apparatus.

The tactile indicator may be arranged moveably on a track and adapted to interact with the reference feature by varying interference therewith to generate a tactile signal indicative of the position of the apparatus.

The apparatus may be at least one of a manual seat fore-aft position adjuster, a manual seat height position adjuster, and a manual seat-back angle adjuster for a seat arranged in the vehicle. The apparatus may also be a rearview mirror positioned in the vehicle. The apparatus may additionally be a steering wheel having its position adjustable by at least one of tilting and telescoping.

Also disclosed is a vehicle having an adjustment device and a sensory signaling device, such as described above, and a method for manually pre-selecting and retrieving a position of an apparatus arranged inside a vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration of a second type of a visual indicator;

FIG. 4 is a schematic illustration of a third type of a visual indicator;

FIG. 5 is a schematic illustration of an audible indicator;

FIG. 6 is a schematic illustration of a tactile indicator; and

DESCRIPTION OF THE PREFERRED EMBODIMENTS

Figure 1:
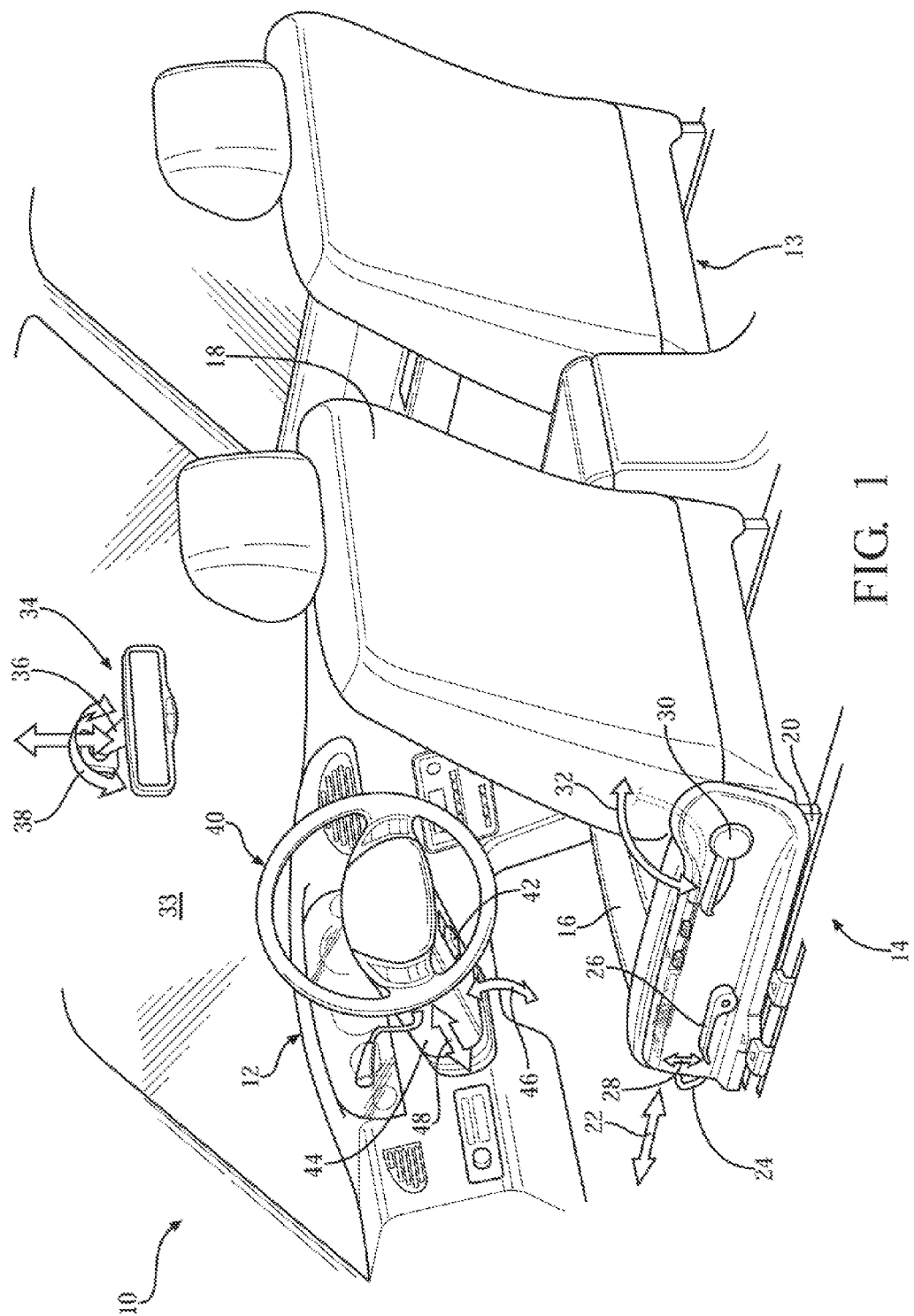
FIG. 1 is perspective view of a vehicle interior illustrating manually adjustable apparatuses, in particular a seat, a rearview mirror, and a steering wheel.
Figure 2:
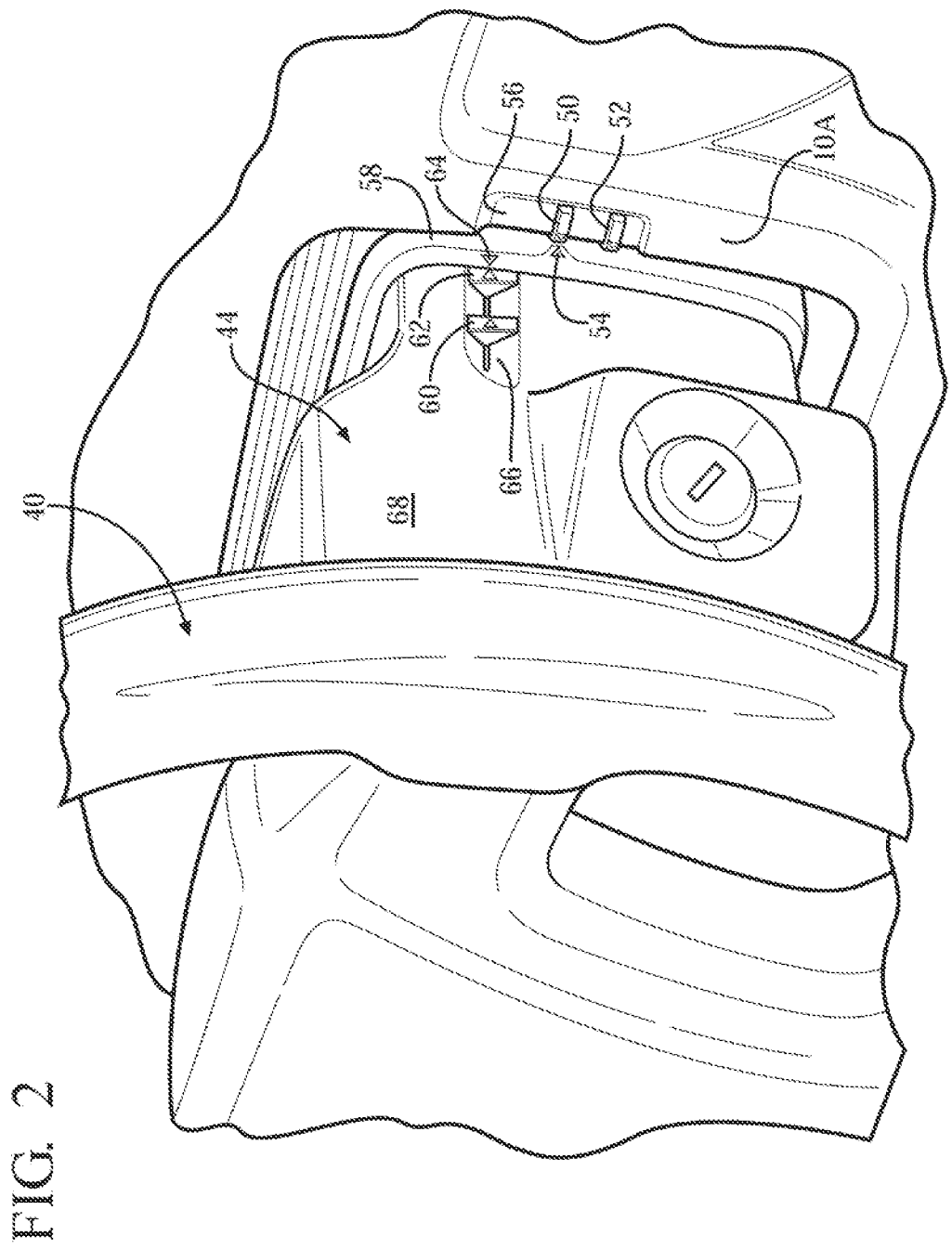
FIG. 2 is a perspective view of one type of a visual indicator positioned relative to the steering wheel shown in FIG. 1.

Referring to the drawings, wherein like reference numbers refer to like components, FIGS. 1 and 2 show a vehicle interior or passenger compartment 10. The interior 10 includes an instrument panel 12 which is positioned at the front of the interior. Interior 10 also includes a number of manually adjustable apparatuses, such as a manually adjustable passenger seat 13 and a manually adjustable driver's seat 14, a manually adjustable rearview mirror 34, and a manually adjustable steering wheel 40. Each of the manually adjustable driver's seat 14, rearview mirror 34, and steering wheel 40 is described in detail below with respect to its particular environment and function.

Seat 14 includes a seat cushion 16, a seat-back 18, and a frame 20. The frame 20 is adapted to support the seat cushion 16, and the seat cushion in turn supports the seat-back 18. The entire seat 14 is manually adjustable fore and aft, i.e., toward and away from the front of the interior. The described fore-aft motion of seat 14 is represented by arrow 22. Arrow 22 fore-aft motion is affected by an adjustment device, in this case a lever 24 operatively connected to frame 20. Lever 24 is adapted to be manually operated by the occupant of the vehicle to pre-select and lock a desired fore-aft position of seat 14, as understood by those skilled in the art.

Seat 14 also includes another adjustment device, in this case a manual seat height position adjuster 26 operatively connected to frame 20, adapted to translate the entire seat up or down, i.e., in a vertical plane, with respect to the interior 10, pre-select, and lock a vertical position of the seat with respect to the interior. The described up-down motion of seat 14 is represented by arrow 28. Seat 14 also includes a manual seat-back angle adjuster 30 adapted to rake or recline and lock the seat-back 18 with respect to the cushion 16. The described reclining motion of seat-back 18 is represented by arrow 32.

Interior 10 also includes a windshield 33. A manually adjustable rearview mirror 34 is affixed to the windshield 33 above the instrument panel 12. An adjustment device, in this case a swivel mechanism 36, is operatively connected to the rearview mirror 34 and adapted to facilitate manual adjustment, pre-selection, and locking of the desired position for the rearview mirror. The described swivel motion of the rearview mirror 34 is represented by a compound arrow 38.

Additionally included in the interior 10 is a manually adjustable steering wheel 40. Steering wheel 40 is adapted to be manually adjustable for tilt and telescope, i.e., up-down and in-out, with respect to the instrument panel 12. Tilt and telescope motion is affected by an adjustment device, in this case a lever 42 operatively connected to a steering column 44, which translates driver input at the steering wheel 40 to front wheels (not shown) of the vehicle. Lever 42 is adapted to be manually operated by the occupant of the vehicle to pre-select and lock a desired position of steering wheel 40, as understood by those skilled in the art. The described tilt motion of the steering wheel 40 is represented by an arrow 46, while the described telescope motion of the steering wheel is represented by an arrow 48.

FIG. 2 depicts visual indicators 50 and 52 positioned relative to the steering wheel 40. Each of the visual indicators 50 and 52 is a type of a sensory signaling device, i.e., a device that emits a signal that is capable of being sensed by an individual or a machine to identify its position with respect to a particular frame of reference, as understood by those skilled in the art. Visual indicators 50 and 52 are operatively connected to the steering wheel 40, and are selectively moveable within a predetermined range with respect to the interior 10. The range of movement for each visual indicator 50 and 52 is predetermined according to the available range of movement of the steering wheel 40. Visual indicators 50 and 52 are configured to identify the pre-selected position of the steering wheel 40, and provide a visual signal indicative of the pre-selected position, thereby facilitating the manual retrieval of the position without trial and error experimentation.

Visual indicators 50 and 52 are adapted to shift or slide relative to and interact, i.e., align, with a reference feature 54 to identify or designate the tilt, up-down position of the steering wheel, and to facilitate subsequent retrieval of the position. Visual indicators 50 and 52 are set on and adapted to be slid along a track 56 by a vehicle operator, which in the particular situation is likely to be the driver of the vehicle. Track 56 is configured as a relief in a panel 10A of interior 10 to provide a predetermined range for the movement of visual indicators 50 and 52, as understood by those skilled in the art. The predetermined range of visual indicators 50 and 52 is indicative of the available movement of steering wheel 40 in the up-down direction.

Reference feature 54 is incorporated into an interior trim section 58 that is configured to be moveable with respect to the interior 10. Two separate visual indicators 50 and 52 are provided to facilitate designation and subsequent retrieval of two distinct tilt positions of steering wheel 40 for two individual drivers. Visual indicators 50 and 52 may be differentiated from each other via dissimilar coloring or numbering, or any other similarly appropriate distinguishing scheme. Although two visual indicators 50 and 52 are shown, nothing precludes the use of fewer or greater number of similar indicators to serve the needs of a different number of drivers.

FIG. 2 also depicts visual indicators 60 and 62 positioned relative to the steering wheel 40. Visual indicators 60 and 62 are adapted to shift or slide relative to and interact, i.e., align, with a reference feature 64 to designate, and to facilitate subsequent retrieval of the telescoping, in-out position of the steering wheel without undue trial and error experimentation. Similar to visual indicators 50 and 52, visual indicators 60 and 62 are set on and adapted to be slid along a track 66 by the driver of the vehicle. Reference feature 64 is incorporated into the interior trim section 58. Track 66 is configured as a relief in a trim panel 68 of steering column 44 to provide a predetermined range for the movement of visual indicators 60 and 62, as understood by those skilled in the art.

The predetermined range of visual indicators 60 and 62 is indicative of the available movement of steering wheel 40 in the in-out direction. Similar to visual indicators 50 and 52, two separate visual indicators 60 and 62 are provided to facilitate designation and subsequent retrieval of two distinct telescope positions of steering wheel 40 for two individual drivers. Just like visual indicators 50 and 52, visual indicators 60 and 62 may be differentiated from each other via dissimilar coloring or numbering, or any other appropriate distinguishing scheme, and either fewer or greater number of similar indicators may be used.

As shown in FIG. 2, reference feature 54 is configured to be moveable with respect to the interior 10, but is fixed in the up-down direction relative to the steering wheel 40, while the indicators 50 and 52 are moveable on the track 56 relative to the vehicle interior 10. Conversely, reference feature 54 may also be fixed relative to the vehicle interior 10, in combination with the indicators 50 and 52 being moveable in the up-down direction along a track on the interior trim section 58 relative to the steering wheel 40 (not shown). Similarly, although reference feature 64 is configured to be moveable with respect to the interior 10, but is fixed in the in-out direction relative to the steering wheel 40, while the indicators 60 and 62 are moveable on the track 66 relative to the steering wheel 40. Conversely, reference feature 64 may also be fixed on the steering column 44 relative to the steering wheel 40, in combination with the indicators 60 and 62 being moveable along a track on the interior trim section 58 in the in-out direction relative to the steering wheel 40 (not shown).

Although reference features 54 and 64 are depicted as contrasting arrows, other similarly appropriate visible features, such as a stand-off or a lighted mark of any shape, may also be employed. For additional clarity, visual indicators 50, 52, 60, and 62 may be backlit, as understood by those skilled in the art. While visual indicators 50, 52, 60, and 62 are shown with respect to the steering wheel 40, visual indicators of such construction may likewise be employed to designate, and to facilitate subsequent retrieval of the desired fore-aft and up-down positions of the seat 14 and the desired swivel position of the rearview mirror 34. Likewise, the aforementioned converse approach to the construction of such visual indicators may also be employed to affect designation and subsequent retrieval of desired positions of seat 14 and rearview mirror 34, as will be readily understood by those skilled in the art.

FIGS. 3 and 4 depict visual indicators 70 and 80, respectively. Similar to indicators 50, 52, 60 and 62, each of the visual indicators 70 and 80 may be positioned relative to the seat 14, steering wheel 40, or mirror 34. Visual indicators 70 and 80 are sensory signaling devices that are operatively connected to the steering wheel 40, and are selectively moveable within a predetermined range with respect to the interior 10. Visual indicator 70 includes a bubble-level device 72 displaying a predetermined range on its outer surface, as understood by those skilled in the art. Bubble-level device 72 is adapted to rotate about an axis 74 in order to align a bubble 72A with a reference feature 76. Reference feature 76 is fixed relative to steering wheel 40. Rotation of the bubble-level is adapted to designate a position of the steering wheel 40, and is indicated by an arrow 78. Visual indicator 80 includes a gauge 82 displaying a predetermined range, as understood by those skilled in the art. Gauge 82 includes a pointer 82A, and is adapted to rotate about an axis 84 in order to align a pointer 82A with a reference feature 86. Reference feature 86 is fixed relative to steering wheel 40. Rotation of the gauge 82 is adapted to designate a position of the steering wheel 40, and is indicated by an arrow 88.

FIG. 5 depicts an audible indicator 90. Audible indicator 90 is a sensory signaling device configured to provide an audible signal to an individual or to a machine. Similar to other sensory signaling devices described above, audible indicator 90 may be positioned relative to the seat 14, mirror 34, and steering wheel 40 in order to facilitate subsequent retrieval of the position without trial and error experimentation. Audible indicator 90 includes a spring element 92 adapted to rotate about axis 94 within a predetermined range set by limits 96A and 96B in order to permit the spring element to generate an audible signal, such as a click, when it is pushed past a reference feature 96. Reference feature 96 is fixed relative to steering wheel 40. Therefore, rotation of the spring element 92 is adapted to designate a position of the steering wheel 40. Rotation of the spring element 92 is indicated by an arrow 98.

FIG. 6 depicts a tactile indicator 100. Similar to other sensory signaling devices described above, tactile indicator 100 may be employed to designate a pre-selected position of an apparatus such as the seat 14, mirror 34 and steering wheel 40, to facilitate subsequent retrieval of the position without trial and error experimentation. Tactile indicator 100 includes a cam element 102 adapted to rotate about axis 104 within a predetermined range set by limits 106A and 106B. A reference feature 106 is fixed relative to steering wheel 40. Therefore, rotation of the cam element 102 is adapted to designate a position of the steering wheel 40. Rotation of the cam element 102 is indicated by an arrow 108.

Tactile indicator 100 also includes a spring 110, which is shown as a clock spring, but may also take the form of any other similarly appropriate spring element adapted to preload the cam element 102 toward reference feature 106 when the cam element comes into contact with the reference feature. During rotation of cam element 102 with respect to reference feature 106, the cam element experiences increased friction when coming into contact with the reference feature, thereby creating a tactile signal to an operator indicative of the pre-selected position of steering wheel 40. Therefore, similar to other sensory signaling devices described above, tactile indicator 100 acts to facilitate subsequent retrieval of the telescoping and in-out positions of steering wheel 40 without trial and error experimentation.

Figure 7:
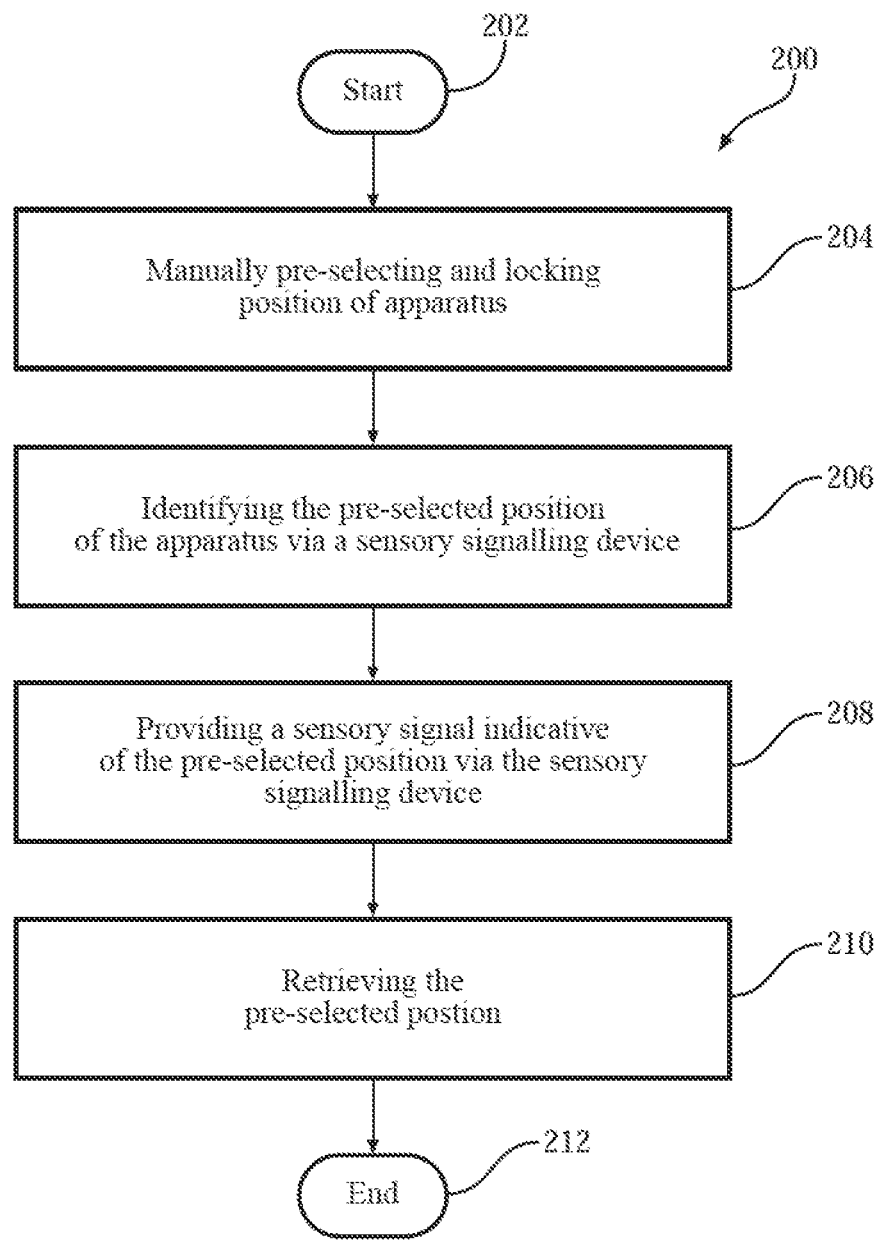
FIG. 7 is a flow chart illustrating a method for manually pre-selecting and retrieving a position of apparatuses depicted in FIG. 1.

FIG. 7 depicts a method 200 for manually pre-selecting and retrieving a position of an apparatus, such as the manually adjustable seats 13 and 14, manually adjustable rearview mirror 34, and manually adjustable steering wheel 40, as described above with respect to FIG. 1. Method 200 is described below with respect to visual indicators 50 and 52 adapted to shift or slide relative to and align with reference feature 54 in order to provide a sensory signal regarding a position of wheel 40 to an operator. The method, however, is equally suitable for being employed to manually pre-select and retrieve a position of any other apparatus and any other sensory signaling device described with respect to FIG. 1.

Method 200 commences in frame 202, and then proceeds to frame 204 where the position of steering wheel 40 relative to the vehicle interior 10 is manually pre-selected and locked by operating lever 42. Following frame 204, in frame 206 the pre-selected position of steering wheel 40 is identified via one of the visual indicators 50 and 52, by selectively moving any of the visual indicators 50 and 52 within the predetermined range to align with the reference feature 54. After the position of steering wheel 40 is pre-selected, the one of the visual indicators 50 and 52 that was aligned with the reference feature 54 acts to provide a visual signal indicative of the pre-selected position to an operator in frame 208. Following frame 208, in frame 210 the pre-selected position of steering wheel 40 is retrieved by the operator without trial and error experimentation, and the method is completed in frame 212.

While the best modes for carrying out the invention have been described in detail, those familiar with the art to which this invention relates will recognize various alternative designs and embodiments for practicing the invention within the scope of the appended claims.

The invention claimed is:

1. A system of a vehicle for manually pre-selecting and retrieving a position of an apparatus by an occupant of the vehicle, the system comprising:
   a non power-assisted adjustment device operatively connected to the apparatus and configured to manually pre-select and lock the position of the apparatus relative to the vehicle solely by a force from the occupant, wherein the apparatus is integrated into the vehicle; and
   a sensory signaling device operatively connected to the apparatus, integrated into the vehicle, and selectively moveable within a predetermined range with respect to the vehicle and to the apparatus, the sensory signaling device configured to identify the pre-selected position of the apparatus and provide a sensory signal to the occupant indicative of the pre-selected position, thereby facilitating the manual retrieval of the position by the occupant without trial and error experimentation;
   wherein the sensory signaling device includes a reference feature fixed relative to one of the apparatus and the vehicle, and at least one of an audible and a tactile indicator, such that the at least one of an audible and a tactile indicator is adapted to be selectively moveable relative to, and to interact with the reference feature to thereby identify the pre-selected position and provide the sensory signal.

2. The system according to claim 1, including the audible indicator, wherein the audible indicator is arranged moveably on a track and adapted to interact with the reference feature by establishing a detent for clicking against the feature to generate an audible signal indicative of the position of the apparatus.

3. The system according to claim 1, including the tactile indicator, wherein the tactile indicator is arranged moveably on a track and adapted to interact with the reference feature by varying interference therewith to generate a tactile signal indicative of the position of the apparatus.

4. The system according to claim 1, wherein the apparatus is at least one of a manual seat fore-aft position adjuster, a manual seat height position adjuster, and a manual seat-back angle adjuster for a seat arranged in the vehicle.

5. The system according to claim 1, wherein the apparatus is a rearview mirror positioned in the vehicle.

6. The system according to claim 1, wherein the apparatus is a steering wheel having its position adjustable by at least one of tilting and telescoping.

7. A vehicle comprising:
  an apparatus integrated into the vehicle and configured to selectively adopt a position relative to the vehicle for accommodating an occupant in the vehicle;
  a non power-assisted adjustment device operatively connected to the apparatus and configured to manually pre-select and lock the position of the apparatus relative to the vehicle solely by a force from the occupant; and
  a sensory signaling device operatively connected to the apparatus, integrated into the vehicle, and selectively moveable within a predetermined range with respect to the vehicle and to the apparatus, the sensory signaling device configured to identify the pre-selected position of the apparatus and provide a sensory signal to the occupant indicative of the pre-selected position, thereby facilitating the manual retrieval of the position by the occupant without trial and error experimentation;
  wherein the sensory signaling device includes a reference feature fixed relative to one of the apparatus and the vehicle, and at least one of an audible and a tactile indicator, such that the at least one of an audible and a tactile indicator is adapted to be selectively moveable relative to, and to interact with the reference feature to thereby identify the pre-selected position and provide the sensory signal.

8. The vehicle according to claim 7, wherein the audible indicator is arranged moveably on a track and adapted to interact with the reference feature by establishing a detent for clicking against the feature to generate an audible signal indicative of the position of the apparatus.

9. The vehicle according to claim 7, wherein the tactile indicator is arranged moveably on a track and adapted to interact with the reference feature by varying interference therewith to generate a tactile signal indicative of the position of the apparatus.

10. The vehicle according to claim 7, wherein the apparatus is at least one of a manual seat fore-aft position adjuster, a manual seat height position adjuster, and a manual seat-back angle adjuster for a seat arranged in the vehicle.

11. The vehicle according to claim 7, wherein the apparatus is a rearview mirror positioned in the vehicle.

12. The vehicle according to claim 7, wherein the apparatus is a steering wheel having its position adjustable by at least one of tilting and telescoping.

13. A method for manually pre-selecting and retrieving a position of an apparatus arranged inside a vehicle by an occupant of the vehicle, the method comprising:
  manually pre-selecting and locking the position of the apparatus relative to the vehicle solely by a force from the occupant by operating a non power-assisted adjustment device operatively connected to the apparatus, wherein the apparatus is integrated into the vehicle;
  identifying the pre-selected position of the apparatus via a sensory signaling device operatively connected to the apparatus, integrated into the vehicle, and selectively moveable within a predetermined range with respect to the vehicle and to the apparatus;
  providing a sensory signal indicative of the pre-selected position via the sensory signaling device to the occupant, wherein the sensory signaling device includes a reference feature fixed relative to one of the apparatus and the vehicle, and at least one of an audible and a tactile indicator, such that said identifying the pre-selected position of the apparatus is accomplished by selectively moving the at least one of an audible and a tactile indicator relative to the reference feature, and said providing a sensory signal is accomplished by the at least one of an audible and a tactile indicator interacting with the reference feature; and
  manually retrieving the pre-selected position by using the sensory signaling device without trial and error experimentation.

* * * * *